(No Model.) 2 Sheets—Sheet 1.
J. A. McCOY.
SYSTEM OF ELECTRIC LIGHTING.
No. 287,040. Patented Oct. 23, 1883.
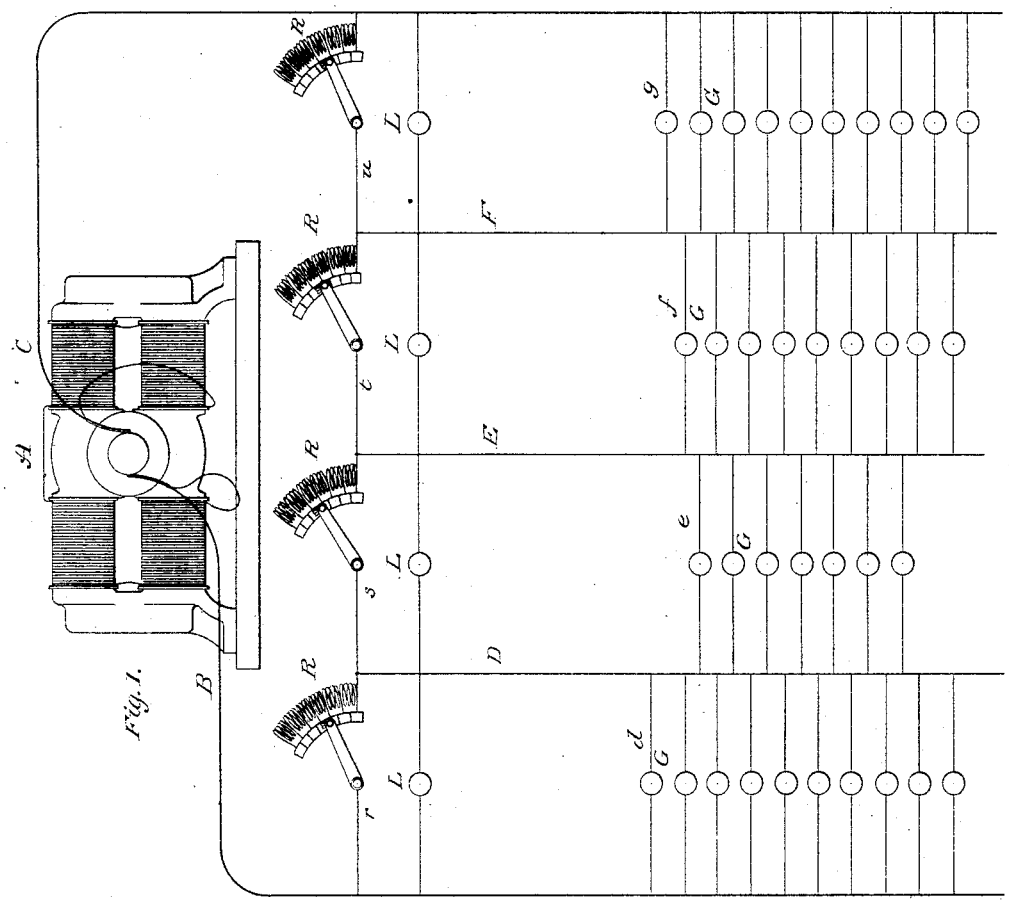
Attest:
Raymond F. Barnes.
W. Frisby.
Inventor:
John A. McCoy
By Parker W. Page
atty.

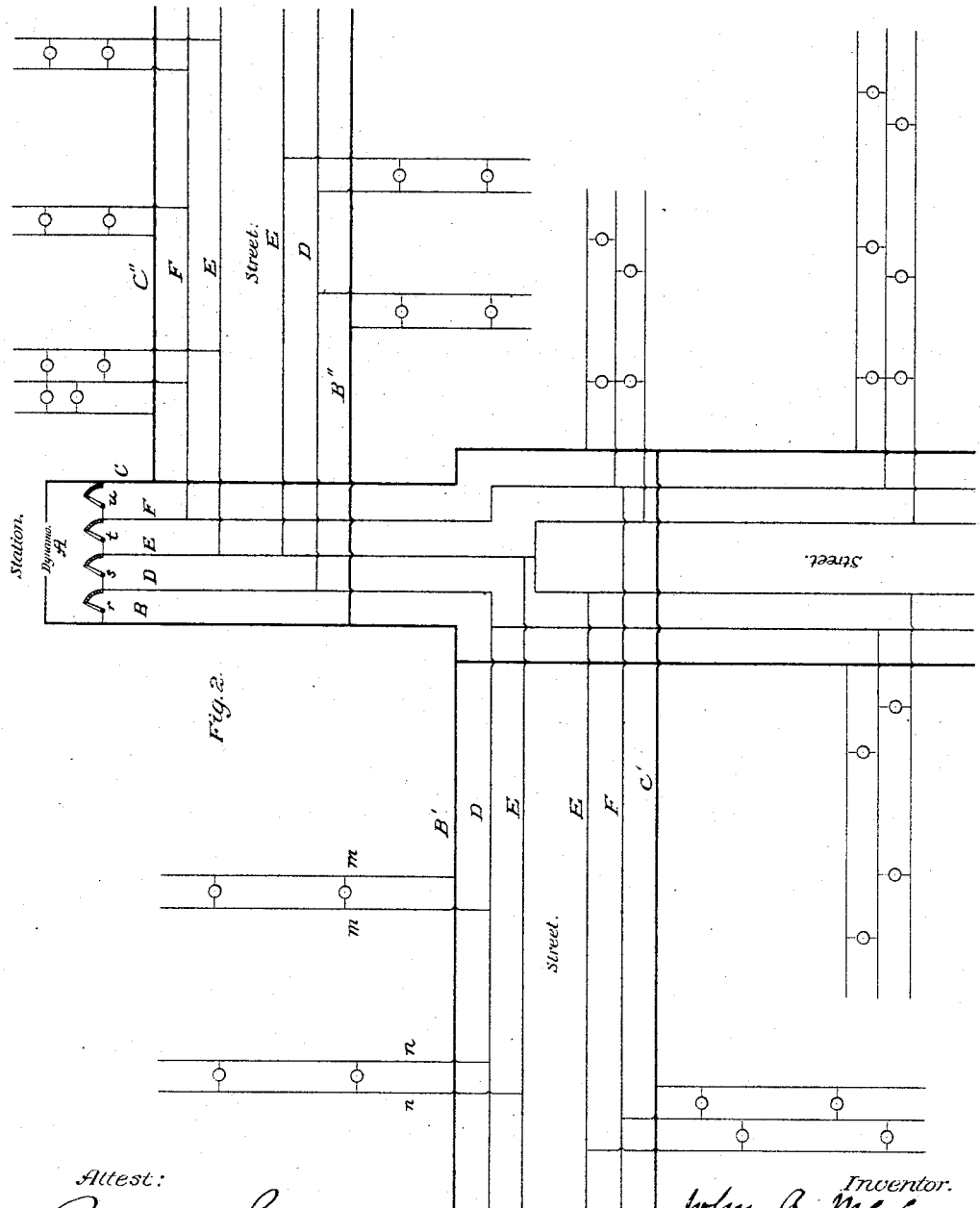

UNITED STATES PATENT OFFICE.

JOHN A. McCOY, OF FALL RIVER, MASSACHUSETTS.

SYSTEM OF ELECTRIC LIGHTING.

SPECIFICATION forming part of Letters Patent No. 287,040, dated October 23, 1883.

Application filed July 31, 1883. (No model.)

*To all whom it may concern:*

Be it known that I, JOHN A. McCOY, a citizen of the United States, and a resident of Fall River, in the county of Bristol and State of Massachusetts, have invented certain new and useful Improvements in Systems of Electric Lighting, of which the following is a specification, reference being had to the drawings accompanying and forming a part of the same.

Heretofore in systems of electrical generation and distribution for incandescent lighting or similar purposes the lamps or analogous devices have usually been connected to the main circuit from the generator in multiple arc. In some instances, however, they have been connected up in multiple series—that is, two or more lamps or other devices have been connected in series in the branch circuits connecting the main conductors, or the main conductors have been divided into two or more groups of branches, each branch containing one or more lamps. These systems are open to certain objections, however, from the fact that provision must be made for maintaining the continuity of the circuit or any branch thereof upon the extinction of any one or more of the lamps, and for maintaining also a balance of resistances under the same circumstances, in order that the lamps which remain in circuit may receive their due proportion of current. These results have been attained heretofore by means involving great expense and mechanisms of a complicated character, both of which objections are unavoidable in the arrangement of circuits heretofore employed.

My present invention consists in a system or a combination of a generator, lamps, and a peculiar and novel arrangement of circuits, and means for controlling the distribution of current in the same, which avoids the objections above stated, and provides an economical and simple means for the distribution of currents for incandescent lighting or similar purposes.

In carrying out my invention I run from a generator, in addition to the two main conductors usually employed, one or more additional or intermediate conductors, and run cross-circuits from the main conductors to such intermediate conductors. In the cross-circuits I include the devices which it is intended to supply with current—for instance, incandescent lamps. When the system is in operation, the path for the current is from one main conductor through the cross-circuits to an intermediate conductor, and from thence to the next intermediate or main conductor, as the case may be, and back to the generator. The lamps are thus run in multiple series, and no change in the amount of current which they receive will take place, assuming the electromotive force developed by the machine to remain constant, unless the aggregate resistance of one of the groups of cross-circuits be varied with respect to the others. In the event of such change the active lamps will receive a greater or less proportion of current, as the case may be; but in order to prevent this from occurring, I connect the intermediate circuits with the main conductors and with each other by cross-circuits including variable resistances, by means of which an even balance may be maintained, and due compensation made for the removal or insertion of lamps.

I will describe my invention more fully by reference to the accompanying drawings, in which—

Figure 1 is a diagram illustrative of the principle of the invention; Fig. 2, a diagram showing the general applicability of the system to systems of lighting or the like.

Referring to Fig. 1, A designates a suitable generator, which may be one or more dynamo or magneto machines, or a galvanic or secondary battery.

B C are the main conductors, leading from the positive and negative poles of the generator through a given district in which are to be located the translating devices.

D, E, and F are other conductors, running from the generator or in the vicinity of the same, but not directly connected with its poles, and therefore, for sake of convenience, designated herein as "intermediate" conductors or lines.

The letters $d\ e\ f\ g$ indicate cross-circuits between the conductors, and G G are lamps or translating devices included in the same, and made as to resistance and character of construction to conform to the well-known requirements of systems of this kind.

R R are used to designate ordinary resistance-coils or rheostats, which are included in circuits *r s t u*, between the main and intermediate conductors.

The operation of the system is as follows: If the circuits *d, e, f*, and *g* are equal in number, their aggregate resistance is the same, and to work under the most efficient conditions the circuits *r s*, &c., are entirely interrupted or the greatest possible resistance inserted in them. If, for any reason, one or more of the lamps in any group of cross-circuits be extinguished, or it be desired to run less lamps in one group than in another, the increased aggregate resistance of the remaining branches renders it necessary to lower the resistance around such group in order to maintain a proper balance. For example, if there are ten of the cross-circuits *d* and seven of the circuits *e*, the rheostat in cross-circuit *s* must be turned to lower the resistance of the circuit *s*, so that the aggregate resistance of the circuits *e* and *s* may be the same as that of the other groups. As a convenient means of determining when this is so, I employ some indicator of the current—for example, standard lamps L L in cross-circuits between the conductors and close to the machine. The attendant at the generator, by observing the relative candle-power of the lamps L, is able to keep the resistances balanced, so that all the lamps in the system will receive the same proportion of current.

It is evident that for one of the main or one of the intermediate conductors the ground may be used; but I prefer to employ metallic conductors.

The system which I have now described may be carried out on a more extensive scale, as will appear from Fig. 2, which is designed to illustrate a practicable arrangement of circuits through a given section of a town. A is the generator, located at the central supply-station; B C, the main conductors, which may be carried from street to street, and branched or divided, as may be necessary, B' B" and C' C", for instance, indicating branches taken off into side streets. D E F are the intermediate conductors, emanating from the station and following the general course or direction of the main conductors. From the main to the intermediate conductors, or from one intermediate conductor to another, run cross-circuits, in which the translating devices are included. For example, the circuit *m m* is from the line B to the line D, circuit *n n* from the line D to line E, and in a similar manner other circuits may be formed as indicated. At the station and between the several lines the resistance-circuits *r s t u* are run, and by means of them the proper relative resistances between the several lines are maintained.

I am aware that in multiple-series systems circuits containing variable resistances have been run around the groups of multiple circuits; but this I do not broadly claim. In my invention, however, which provides a practicable system for general supply from central stations, the resistance-circuits are brought under the control or observation of the operator or attendants at the station, all the lamps are independently controllable, smaller conductors may be used, and all the advantages of multiple series fully attained.

I do not claim any special form of rheostat or variable resistance, nor any special means of operating the same, whether automatic or manual, as the same may be greatly varied; but, having described the essential features of my invention, and reserving the right to make subject of other applications features of novelty herein shown or described but not claimed, What I now claim is—

1. In a system of electrical distribution, the combination, with a generator, main conductors, and one or more intermediate conductors, of translating devices connected in multiple series with the conductors, and circuits of variable resistance connecting said conductors together, as and for the purpose set forth.

2. In a system of electrical distribution, the combination, with a generator located at a central station, main conductors from the generators, and one or more intermediate conductors emanating from the station, of translating devices connected in multiple series with the conductors, circuits connecting the several conductors, and variable resistance devices or rheostats contained therein.

3. In a system of electrical distribution, the combination, with a generator located at a central station, main conductors from the generator, and intermediate conductors emanating from the station, of translating devices connected in multiple series with the conductors, cross-circuits connecting the several conductors at the station, variable resistances included therein, and cross-circuits including current-indicating devices—such as standard lamps—as and for the purpose set forth.

4. The combination, with a generator, main conductors B C, and intermediate conductors, as D, E, and F, of cross-circuits, as *d e f g*, translating devices included therein, resistance-circuits, as *r s t u*, and rheostats R, these parts being combined and arranged for use in the manner specified.

5. The combination, with a generator, main conductors, as B C, and branches, as B' B" C' C", and intermediate conductors, as D E F, of cross-circuits between the said conductors or their branches, translating devices included in said cross-circuits, resistance-circuits connecting the conductors near the generator, and rheostats included therein.

In testimony whereof I have hereunto set my hand this 26th day of July, 1883.

JOHN A. McCOY.

Witnesses:
JAMES M. COTTON,
HENRY T. BUFFINGTON.